United States Patent [19]
Landoni et al.

[11] Patent Number: 5,888,660
[45] Date of Patent: Mar. 30, 1999

[54] HEAT-SHRINKABLE CO-EXTRUDED MULTILAYER POLYOLEFIN FILM HAVING AN IMPROVED HEAT SEAL RESISTANCE

[75] Inventors: Guido Landoni, Rho, Italy; Gianpietro Landoni, Lugano, Switzerland; Marco Zanella, Venegono Superiore; Maurizio Walter Miehe, Cornaredo, both of Italy

[73] Assignee: Soten S.R.L., Milan, Italy

[21] Appl. No.: 749,976

[22] Filed: Nov. 15, 1996

[30] Foreign Application Priority Data

Nov. 16, 1995 [IT] Italy .................. MI95A2356

[51] Int. Cl.$^6$ ........................... B32B 27/08
[52] U.S. Cl. .................. 428/516; 428/517; 525/240
[58] Field of Search .................. 428/516, 517; 525/240

[56] References Cited

U.S. PATENT DOCUMENTS

| | | | |
|---|---|---|---|
| 4,303,708 | 12/1981 | Gebhardt | 428/516 |
| 4,353,844 | 10/1982 | Bornstein . | |
| 4,643,945 | 2/1987 | Kiang | 428/516 |
| 4,652,489 | 3/1987 | Crass | 525/240 |
| 4,720,420 | 1/1988 | Crass | 428/516 |
| 4,842,930 | 6/1989 | Schinkel et al. | 428/516 |
| 5,049,436 | 9/1991 | Morgan | 428/516 |
| 5,433,983 | 7/1995 | Schuhmann | 428/516 |

FOREIGN PATENT DOCUMENTS

| | | |
|---|---|---|
| 0 092 897 | 11/1983 | European Pat. Off. . |
| 0 454 420 | 10/1991 | European Pat. Off. . |
| 0 588 667 | 3/1994 | European Pat. Off. . |
| 0 409 615 | 5/1995 | European Pat. Off. . |

OTHER PUBLICATIONS

JP 62 086 388, "Heat–shrinkable label used for label or cap–sealing etc.—comprises propylene–based laminate film consisting of 2 or 3 ethylene –propylene random copolymers", Derwent Publications Ltd., London, (Abstract Only), Apr. 20, 1997.

JP 01 195 043, "Polyolefin heat–shrinkable multi–ply film used for packaging—has outer layers of LLDPE and intermediate layer(s) of propylene–ethylene–butene or –alpha–olefin copolymer", Derwent Publications Ltd., London, (Abstract Only), Aug. 4, 1989.

*Primary Examiner*—Paul R. Michl
*Attorney, Agent, or Firm*—Finnegan, Henderson, Farabow, Garrett & Dunner, L.L.P

[57] ABSTRACT

Heat shrinkable co-extruded multilayer polyolefin film having an improved heat seal resistance, comprising:

A) A central layer consisting of a blend obtained by an homogeneous dispersion of an ethylene-propylene-butene terpolymer (EPB) produced by catalysis, in a linear ethylene-alpha olefin $C_4$, $C_5$, $C_6$ or $C_8$ copolymer, said blend being optionally added with a linear ethylene-alpha olefin $C_4$, $C_5$, $C_6$ or $C_8$ copolymer, B) At least two layers externally placed with respect to said central layer and constituted by an ethylene-propylene-butene terpolymer (EPB) produced by catalysis, mixed with an ethylene-propylene copolymer (EPC).

6 Claims, 1 Drawing Sheet

HEAT-SHRINKABLE CO-EXTRUDED MULTILAYER POLYOLEFIN FILM HAVING AN IMPROVED HEAT SEAL RESISTANCE

FIELD OF THE INVENTION

The invention regards the sector of the heat shrinkable films produced by extrusion of polyolefin polymers, used for packaging of various commercial products and also known as display films. Such films may be single or multilayer, in particular 3 or 5.

PRIOR ART

In the heat shrinkable films field known as display films an important problem is constituted by the heat seal resistance. Generally the heat seal represents a weak point for any kind of packaging films, but this fact is particularly accentuated in the case of the heat shrinkable films owing to the following reasons.

First of all in the heat seal area the copolymer deteriorates and then its resistance decreases.

The concomitant action of the force and of the retraction percentage in the application step causes a stress in the whole film structure and in particular it finds a weak point in the heat seal itself.

Finally it is clear that the heat seal resistance depends either on the resistance of the polymer and on the thickness of the film heat sealing layer itself.

Considering the co-extruded multilayer films, they have total thicknesses ranging from 12.5 to 25 micron while the heat sealing layers thicknesses, in the normal technique, are ranging from 1.2 to 5 micron.

This implies that the heat seal resistance, being linked directly to the thicknesses of the two heat sealed layers, is not proportional to the total thickness of the film.

In particular we notice that in any kind of heat seal known in the technique (filament, hot plate, radio frequency and ultrasonic) it never happens that layers differing from the adjacent ones join together. This is widely proved by the microscopic analysis of the heat seals. In order to improve the heat seal resistance several techniques have been proposed. For example according to U.S. Pat. No. 4,352,844 (Grace) an improved resistance of the heat seals is obtained in a heat shrinkable film having 3 or 5 layers all based on various kinds of EVA, if a copolymer having melting point higher than those relative to the EVA used for the other inner layers is used for the heat sealing external EVA layers. The European Patent EP 92897 (American Can) refers of a heat shrinkable multilayer structure with barrier characteristics, easy heat sealing and high heat seal resistance, constituted by a 3 or 5 layers film wherein the external heat sealed layers are constituted by EVA having 6–12% of VA and m.i. (melt index) equal to 0.3/0.9, if necessary mixed with LLDPE having m.i. equal to 0.5/1.5.

The EVA amount in the mixture may range from 90 to 10% while the LLDPE may range from 10 to 90%. The barrier layer is formed by PVDC or EVOH or by mixtures of the same ones with EVA.

The possible layer intermediate between the barrier one and the heat sealing layer is composed by a mixture of 90–10% LLDPE and 10–90% EVA. The European Patent EP 409615 (Du Pont) refers of the following composition as an excellent example of heat sealing layer:

1. from 10 to 80% by weight (preferably from 45 to 60%) of at least a linear ethylene-alpha olefin copolymer having a density ranging from 0.890 to 0.915,
2. from 15 to 70% by weight (preferably from 30 to 45%) of at least a kind of polyethylene selected from: linear polyethylene-alpha olefin copolymer having a density about equal to 0.915–0.940 and LDPE having a density about equal to 0.920–0.925,
3. from 0 to 25% by weight (preferably from 5 to 15%) of at least an ethylene copolymer having at least one of the following comonomers: vinylalkanoate, alkyl acrilate or alkyl metacrilate.

The layer obtained by this composition may form by itself a single layer film or the heat sealing layer in a multilayer film.

SUMMARY

Now it has been found that a multilayer heat shrinkable film based on ethylene-propylene-butene terpolymer (EPB) and on linear low density polyethylene (LLDPE) suitably added and combined one another, allows to overcome the problems relating to heat seal resistance creating a product having the following characteristics:

low temperature heat sealing with heat sealing resistance higher than analogous known films one, good optical and mechanical characteristics and high tear resistance.

The film according to the present invention comprises:

A) a central layer consisting of an intimate mixture or blend obtained by a homogeneous dispersion of an ethylene-propylene-butene terpolymer (EPB) produced by catalysis (I), in a linear ethylene-alpha olefin $C_4$, $C_5$, $C_6$ or $C_8$ copolymer (LLDPE) (II).

The percentage of said terpolymer ranges from 20 to 70% by weight, preferably from 30 to 50% by weight and the percentage of said copolymer ranges from 30 to 80% by weight and preferably from 50 to 70% by weight. Said intimate mixture may be in turn added with a linear ethylene-alpha olefin $C_4$, $C_5$, $C_6$ or $C_8$ copolymer (III) in an amount such that (I+II) ranges from 20 to 80% by weight and (III) ranges from 80 to 20% by weight.

B) At least two layers placed externally with respect to said central layer and composed by an ethylene-propylene-butene terpolymer (EPB) obtained by catalysis (I) mixed with an ethylene-propylene copolymer (EPC) (IV). The mixture comprises from 90 to 40% by weight of (I) and from 10 to 60% by weight of (IV). The so obtained film gives heat seals having an average resistance greater or equal to about 70 MPa against values equal about to 40 MPa found on analogous products obtained by the known techniques.

DETAILED DESCRIPTION OF THE INVENTION

Figure 1:
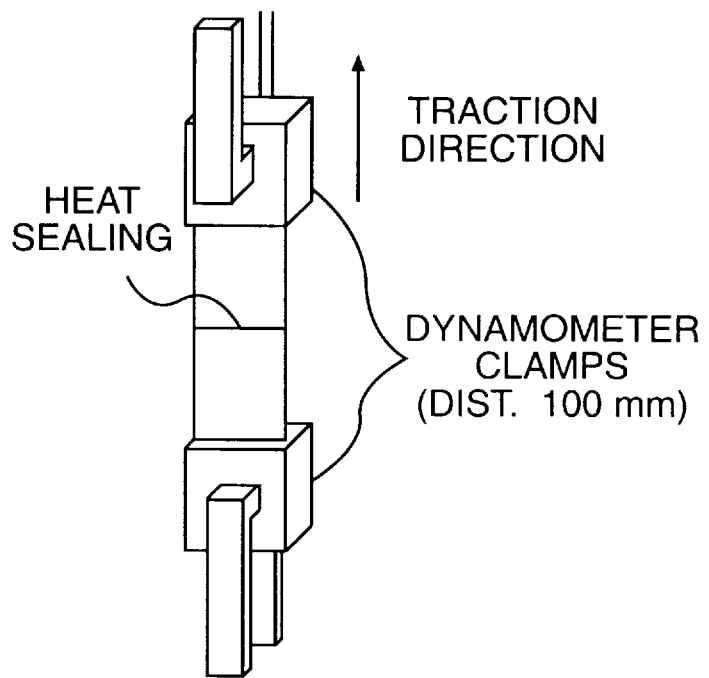
FIG. 1 represents the dynamometer used for the determination of the heat seal resistance of the films.

The characteristics and the advantages of the heat shrinkable co-extruded multilayer polyolefin film according to the present invention, will be mostly pointed out during the following detailed description.

The main advantages of the film object of the present invention are constituted by the easy heat sealing in a wide temperature range with different heat sealing systems and by the high resistance of the obtained heat seal.

Said film comprises:

A) a central layer consisting of an intimate mixture or blend suitably prepared according to the method later described and constituted by a homogeneous dispersion of an ethylene-propylene-butene terpolymer (EPB)

produced by catalysis (I), uniformly distributed in a linear ethylene-alpha olefin copolymer (LLDPE) (II).

Such copolymer has comonomers of butene, methylpentene, hexene or octene. In turn LLDPE having as comonomer an alpha olefin $C_4$, $C_5$, $C_6$ or $C_8$ (LLDPE III); many be added to this homogeneous blend; LLDPE II may be equal to LLDPE III.

B) At least two layers placed externally with respect to said central layer and composed by an ethylene-propylene-butene terpolymer obtained by catalysis process (EPB) (I) with addition of ethylene-propylene copolymer (EPC) (IV).

In order to improve the characteristics of formability and the behavior of the film in the application phase, little amounts of substances commonly used in the production technique of the plastic films as for example erucic amide, micronized silica and if necessary hydrogenated hydrocarbon resins may be added in the various layers. The basic polymers of the film according to the present invention and the polymers added to them have the following characteristics.

The terpolymer EPB (I) is a catalysis product comprising a matrix consisting of a polypropylene homopolymer and of a disperse phase consisting of synthesis elastomers ethylene-propylene and propylene-butene in amounts which may range according to the final desired characteristics.

The density of this terpolymer ranges from 0.885 to 0.895 g/cm$^3$ and its melt index from 3.5 to 7 g/10 min at 230° C.

An used product is for example the Adsyl 5C 37F (Montell) having a density equal to 0.890 g/cm$^3$, melt index ~5 and starting heat seal temperature near to 105° C.

The linear polyethylene (LLDPE) (II) preferably used is a linear ethylene-alpha olefin copolymer wherein the comonomer is of the $C_8$ kind (octene), however the comonomer may be of the $C_4$, $C_5$ or $C_6$ kind (butene, pentene or hexene). The density ranges from 0.911 to 0.925 g/cm$^3$ and the melt index ranges from 0.9 to 2.2 g/10 min at 190° C. In particular the polyethylene ClearFlex FG 308 by the Polimeri Europa having density equal to 0.920 and melt index equal to 1 is used.

The blend composing the central layer is prepared as follows:

an amount ranging from 20 to 70% by weight (preferably from 30 to 50%) of terpolymer EPB (I) and an amount of LLDPE (II) ranging from 30 to 80% by weight (preferably from 50 to 70%) are mixed very homogeneously to the obtainment of an uniform dispersion of the two phases one into the other;

some linear polyethylene of the kind III above described may be added to a such blend in such an amount that (I+II) ranges from 20 to 80% by weight and (III) ranges from 80 to 20% by weight. In particular in a preferred form of the invention the use of said blend is provided in a mixture with said linear polyethylene in 1:1 ratio by weight.

The amount and the quality of the various polymers used in the preparation of the film depends on the characteristics desired for the film and on the characteristics of the polymers themselves. We found that preliminarily dispersing in an homogeneous way the terpolymer EPB (I) in the LLDPE (II) without altering by thermal and/or mechanical effect the characteristics of the above mentioned polymers (for example by dispersion in a low revolutions number double screw counter rotating mixer, or in a double screw co-rotating mixer having a special screws profile and operating at low temperature) an intimate mixture or blend which once extruded in the central layer of the film gives to the film itself some special characteristics, is obtained. For example the three-layer film having the central layer consisting of a blend having a 1:1 ratio by weight of EPB (I) and LLDPE (II) and the external layers consisting of a mixture containing 90% by weight of EPB terpolymer (I) and 10% by weight of EPC copolymer (IV) has good optical and mechanical resistance characteristics but in particular leads to heat seals having a resistance to 70% greater with respect to the analogous films on the market one.

In particular distribution of the external layers thicknesses with respect to the products available on the market being equal, the film object of this patent shows a heat seal resistance about 70% greater. This is the case of a three-layer film having a thicknesses distribution equal to 22%/56%/22%. On the contrary in the case of reduced thicknesses of the external layers (for example 14%/72%/14%) the heat seal resistance turns out to be always greater but to a lower extent (from 10% to 20%). This alternative version of the product also shows some advantages in that reducing the percentage of polypropylene on the outside, present as copolymer and terpolymer structure of co-extruded film having a higher tearing propagation resistance is obtained.

The result surprising in heat seal resistance terms combined with the good mechanical and optical characteristics of the film is obtained when the above mentioned central layer in a three-layer structure as described above is constituted by an homogeneous blend EPB/LLDPE obtained using particular compounding conditions. In particular a suitable preparation of the above mentioned blend provides for the following steps:

a) Homogeneous mixing of the granules of the two substances by a vertical or horizontal conveyor mixer or by a low velocity blade mixer.

b) Extrusion of the mixture by a single screw extruder having a special profile screw for LLDPE and with a dynamical mixer of the so-called Maddock kind or by a counter rotating double screw extruder or by co-rotating double screw extruder. Preferably a double screw extruder of counter rotating kind having diameter equal to 60 mm and screws length equal to 22 diameters is used.

The operative conditions are such to limit as much as possible a thermal or mechanical stress to the mixture of polymers and therefore we operate at low revolutions number (about 25/min) and at a relatively low temperature.

In particular a melt temperature ranging from 195° to 198° C. is recorded.

c) Granulation by the known technique of crosscut by water cooling.

d) Drying by centrifugation of the granules in a suitable centrifuge which may be crossed or not by a hot air jet at 60°/70° C. according to the productive needs and mixing of the granules obtained in a vertical conveyor mixer in order to guarantee the homogeneity of the product to use for the intermediate layer.

A very homogeneous blend wherein the terpolymer EPB (I) is uniformly dispersed in the linear polyethylene (II) is so obtained. Such a blend is then used as it is or in mixture with further LLDPE of the III kind in order to produce the central layer in the co-extruded structure having at least two external layers. The heat shrinkable film according to the present invention is produced by the process of the twin-bubble technique providing for:

A) Preparation of the polymers mixtures necessary to the various layers comprising the already mentioned process additives, in particular antiblocking (SiO$_2$) and sliding (erucic amide).

B) Co-extrusion of the various layers in suitable annular head.

C) Fast cooling of the tubular at the outlet from the extrusion head from a temperature about equal to 200° C. to a temperature equal to 15°–20° C. in 5–8s.

D) Warming of the tubular to a temperature close to softening ranging from 120° to 150° C.

E) Film biaxial orienting by the twin-bubble stretching technique.

F) Fast cooling of the oriented film to a temperature ranging from 20° to 30° C.

The so obtained heat shrinkable bioriented films show the following characteristics:

high mechanical resistance with breaking loads always greater than 100 MPa and extensibility greater than 110%;

good tearing resistance, however always greater than 7 g in both the directions (longitudinal/transversal) for a film having a thickness equal to 15 micron;

good optical characteristics with haze (opacity) about equal to 1.5% and gloss (brightness) about equal to 130 photoelectric cell units;

heat seal starting temperature lower than the normal polypropylene homo-and copolymers existing on the market and close to 100° C. (precisely about 105° C.);

heat seal mechanical resistance particularly high and decidedly higher than the other analogous co-extruded films available on the market, in particular values greater on the average than 70 MPa against 40–50 MPa for the commercial films;

very high shrinking percentage: from 60 to 70% at 120° C. It turns out clear from what has been described that by the technique of the present invention it is possible to obtain a heat shrinkable polyolefin film which, while keeping good general characteristics, turns out to have a weldability and a heat seal resistance markedly greater with respect to the analogous products available on the market.

The following examples are reported by way of illustration, wherein the heat seal resistance has been determined by the following method.

METHOD FOR THE DETERMINATION OF THE HEAT SEAL RESISTANCE ON HEAT SHRINKABLE FILMS

1) Aim

The aim of the method is the determination of the heat seal resistance performed in controlled conditions on a heat shrinkable film by dynanometric traction of standard samples, previously united by hot wire impulse welding.

2) Description of the method

Film samples are heat sealed by the action of the pressure and of the temperature exerted by: a warmed wire bar.

From such samples specimens having known sizes undergoing the action of a dynamometer recording the stress needed to open the heat seal are obtained.

3) Equipment a) Hot bar flat welder "Sentinel" mod. 12AS, or alternative equipment allowing to operate impulse weldings with thread-like bar -in reproducible conditions.

b) Digital dynamometer Instron series 4400 or analogous equipments.

c) Thickness tester having reading capability equal to 0.001 mm, pressure exerted on the sample: 3.18 kg/cm$^2$.

d) Hand punch press and hand punches having sizes equal to 100 by 20 mm, or plastic or metallic material templates having the suitable sizes for the specimens cut.

4) Process

From the reel to test pick up at regular distances two couples of samples having sizes equal to 30 by 20 cm parallelly to the extrusion direction. For any couple execute to heat seals along the minor borders in such a way that the heat seals result in a transversal direction with respect to the extrusion direction and executing the heat seals on both the surfaces of the film (external-external and internal-internal).

Use the following operative conditions for the welder:

welding bar temperature: 130° C.

bar contact time: 1 second pressure at the manometer: 40 psi

From each so obtained sample pick up two specimens having width equal to 20 mm and length greater than the distance separating the dynamometer clamps (100 mm), practically specimens having length about equal to 150 mm are used. The heat seal (transversal with respect to the major axis) will result at half specimen (see FIG. 1).

Arrange the dynamometer in the following way:

insert the traction-compression measure cell having a capacity equal to 100N arrange the crossbar velocity at 100 mm/min arrange the distance between the clamps at 100 mm.

Then submit each specimen to the estimation of the tearing tension by the dynamometer. In placing the specimens in the dynamometer clamps it is necessary to perfectly align the major axis of the sample with the clamps axis in order to apply an uniform traction on the whole length of the heat seal (see FIG. 1).

5) Calculations

The result of the measure is given in grams/cm and it is obtained by the expression:

$$R.S.=A/B$$

where

A=load read at the breaking point of the heat seal given in grams;

B=specimen width, given in cm (equal to 2 cm).

Sometimes the result is used to be given in terms of maximum stress bear sustained by the heat seal, the value being obtained dividing the maximum heat seal breaking load recorded by the instrument for the cross section of the specimen, according to the formula:

$$C.R.=C.M./S$$

where:

C.R.=stress corresponding to the heat seal breaking, given in N/mm$^2$=MPa;

C.M.=load corresponding to the heat seal breaking, given in N;

S=cross section of the specimen, given in mm$^2$.

Note: the cross section of the specimen is obtained multiplying the minimum thickness of the sample, measured by the thickness gage and given in mm by the width of the specimen itself.

EXAMPLE 1

A co-extruded three-layer film is prepared, with the two external layers having the same composition. The compositions are the following:

Central Layer

A mixture composed as follows is prepared:

50% by weight of terpolymer EPB (I) of Adsyl 5C37F (Montell) kind having a density equal to 0.89 and melt index equal to 5;

50% by weight of LLDPE (II) of Clearflex FG 308 (Polimeri Europa) kind having a density equal to 0.92 and melt index equal to 1.

Such a mixture is then drawn in a counter rotating double screw extruder having 60 mm diameter screws at a rotation velocity≈25 Rpm. The temperatures outline does not exceed 200° C. and the melt maximum temperature ranges from 195° to 198° C. The so obtained granules are mixed with 2% by weight of a sliding masterbatch comprising 6% of erucic amide and 94% of LDPE (for example the AD Wax 90111 kind produced by Frilvam).

External Layers

The same terpolymer EPB (I) used in the central layer (Adsyl 5C37F) is used as basic polymer. 5% by weight of a copolymer ethylene-propylene (IV) having a density equal to 0.897 and melt index equal to 1.8 (Eltex KL 415 produced by Solvay) is added to said polymer. 0.6% by weight of a masterbatch containing 20% of micronized silica and 80% of LDPE (AB 6002 LD produced by Constab) are added as external antiblocking agents. Then an homogeneous mixing in a vertical conveyor mixer is carried out.

The thickness distribution of the layers is the following:

external layers: about 22% for each single layer intermediate layer: about 56%.

Film Preparation

The mixtures for each layer obtained as described above have been co-extruded in the respective drawplates pertaining to each layer of the twin-bubble stretching device.

The maximum temperature of the melted material has been about equal to 210° C. for the central layer and about 220° C. for the external layers. The temperature of the tubular at the outlet from the annular head (first bubble) has been about equal to 210° C. The tubular has been cooled at the outlet from the head at a temperature about equal to 18° C. in about 6 seconds by crossing through an external annular element from which continuously flowed a liquid cooling at 12° C. and an inner annular element cooled at 6° C. The same tubular has been subsequently warmed at a temperature equal to 130° C. and submitted to bi-orienting by the bubble stretching technique. The stretching ratio turned out to be equal to 1:5.2 in the longitudinal direction and 1:5.0 in the transversal direction.

Then the film has been cooled at a temperature about equal to 25° C. by air conditioning blowing at about 8° C. The weight ratio between the central layer and the external ones was 75:25 and the total thickness was equal to 15 micron.

The characteristics of the obtained film are reported in the table 1 which shows that the film has good optical and mechanical characteristics, in addition to an exceptional heat seal resistance.

EXAMPLE 2

The Example 1 is repeated with the difference consisting in the following thickness distribution of the layers:

external layers about 14% each intermediate layer about 72%.

In this case the heat seal resistance is reduced to the products on the market one, while the tearing resistance sensibly increases.

EXAMPLE 3

The Example 1 is repeated with the difference that the central layer is not obtained from the blend produced by the double screw mixer, but by a mixture not previously drawn and directly extruded on the double bubble co-extrusion device.

The results reported in the table 1 show that, even if the heat seal characteristics and the other film properties continue to be good, the product has characteristics lower than the Example 1 ones.

EXAMPLE 4

The Example 1 is repeated with the difference that the blend of the central layer prepared on a double screw extruder turns out to be so composed:

EPB (I)/LLDPE (II) 30/70% by weight. The external layers remain the same.

The characteristics of the obtained film are reported in table 1.

EXAMPLE 5

The Example 1 is repeated with the difference that in the central layer 50% by weight of LLDPE (II) of the same kind used for the preparation of the same blend (Clearflex FG 308) is added to the blend 50/50 EPB (I) LLDPE (II). The external layers remain the same.

The characteristics of the obtained film are reported in table 1.

EXAMPLE 6

The Example 4 is repeated with the difference that in the central layer 50% by weight of LLDPE (II) of a kind different from that used for the preparation of the same blend is added to the blend 50/50 EPB (I)/LLDPE (II). In particular LLDPE Innovex LL 7909 AA by BP Chemicals kind having a density equal to 0.936, melt index equal to 0.9 and comonomer 4 methyl-pentene is used.

The external layers remain the same.

The characteristics of the obtained film are reported in table 1.

EXAMPLE 7 (comparison)

A film having the central layer composed by the LLDPE (II) only is prepared as a comparison example. The external layers remain the same. The characteristics of the obtained film are reported in table 1.

EXAMPLE 8 (comparison)

The Example 6 is repeated as further comparison example with the difference that the external layers are composed by the terpolymer EPB (I) only. The characteristics of the obtained film are reported in table 1.

NOTE: In order to point out the improvements obtained by the film object of the invention, the characteristics of a heat-shrinkable polyolefin film diffused on the market are reported in table 1 too.

TABLE 1

| | ASTM N. | Ex. 1 | Ex. 2 | Ex. 3 | Ex. 4 | Ex. 5 | Ex. 6 | Ex. 7 | Ex. 8 | Film on the market |
|---|---|---|---|---|---|---|---|---|---|---|
| Thickness ($\mu$) | D 374 | 15 | 15 | 15 | 15 | 15 | 15 | 15 | 15 | 15 |
| Ultimate tensile stress TD (MPa) | D 882 | 127 | 124 | 120 | 116 | 114 | 109 | 117 | 112 | 110 |
| Elongation at break | D 882 | 105 | 110 | 103 | 115 | 123 | 120 | 123 | 128 | 100 |
| Tearing strength TD (g) | D 1938 | 6.2 | 7.8 | 6.0 | 7.0 | 7.5 | 6.6 | 7.1 | 8.0 | 5.0 |
| Shrinking at 120° C. TD % | D 2732 | 58 | 61 | 58 | 60 | 63 | 59 | 64 | 65 | 60 |
| Heat seal resistance (inner method) | | 70 | 56 | 58 | 63 | 60 | 45 | 42 | 37 | 50 |
| Haze (%) | D 1003 | 1.6 | 1.7 | 1.7 | 1.7 | 1.8 | 2.0 | 1.5 | 1.4 | 1.6 |
| Gloss (photometric unit) | D 2457 | 128 | 126 | 126 | 127 | 126 | 128 | 127 | 120 | 122 |

We claim:

1. A multilayer heat-shrinkable coextruded polyolefin film comprising:
    A) a central layer containing a blend obtained by an homogenous dispersion of an ethylene-propylene-butene terpolymer (I), produced by catalysis, in a linear copolymer (II) consisting of ethylene and an alpha olefin selected from the group consisting of $C_4$, $C_5$, $C_6$ and $C_8$ olefins, said blend being optionally added with a linear copolymer (III) consisting of ethylene and an alpha olefin selected from the group consisting of $C_4$, $C_5$, $C_6$ and $C_8$ olefins; and
    B) at least two layers externally placed with respect to said central layer and containing an ethylene-propylene-butene terpolymer (I) produced by catalysis, mixed with a copolymer (IV) consisting of ethylene and propylene.

2. Heat-shrinkable film as claimed in claim 1, wherein said blend consists of 20–70% by weight of said terpolymer (I) and of 80–30% by weight of said copolymer (II).

3. Heat-shrinkable film as claimed in claim 1, wherein said blend consists of 30–50% by weight of said terpolymer (I) and of 70–50% by weight of said copolymer (II).

4. Heat-shrinkable film as claimed in claim 1, wherein said copolymer (III) is added to said blend in such an amount that (I)+(II) ranges from 20 to 80% by weight and (III) ranges from 80 to 20% by weight.

5. Heat-shrinkable film as claimed in claim 1, wherein in said external layers said terpolymer (I) is contained in an amount ranging from 90 to 40% by weight and said copolymer (IV) is contained in an amount ranging from 10 to 60% by weight.

6. The multilayer heat-shrinkable coextruded polyolefin film as claimed in claim 1, wherein said blend is prepared by the following steps:
    a) mixing of the terpolymer (I) with the copolymer (II) both in granular form;
    b) extrusion of the mixture obtained in step a) at a temperature ranging from 195° to 198° C.;
    c) granulation by water cooling cut; and
    d) drying at a temperature ranging from 60° to 70° C.

* * * * *